Z. OSTENBERG.
CHEMICAL APPARATUS.
APPLICATION FILED FEB. 7, 1916.

1,220,778.

Patented Mar. 27, 1917.

INVENTOR
Jeno Ostenberg
BY John A. Naismith
HIS ATTORNEY

UNITED STATES PATENT OFFICE.

ZENO OSTENBERG, OF SAN FRANCISCO, CALIFORNIA, ASSIGNOR TO INTERNATIONAL CELLULOSE COMPANY, OF RENO, NEVADA, A CORPORATION OF NEVADA.

CHEMICAL APPARATUS.

1,220,778.  Specification of Letters Patent.  Patented Mar. 27, 1917.

Application filed February 7, 1916. Serial No. 76,687.

*To all whom it may concern:*

Be it known that I, ZENO OSTENBERG, a citizen of the United States, and resident of San Francisco, in the county of San Francisco and State of California, have invented certain new and useful Improvements in Chemical Apparatus, of which the following is a specification.

My invention relates to chemical apparatus, and particularly to apparatus for dissolving and hydrolyzing cellulose and its derivatives in which cellulose containing material is subjected, in proper quantity and form, to the action of an acid spray and finally digested and the products of hydrolysis extracted.

It is the object of my invention to provide an apparatus of the above indicated character by means of which the cellulose containing material can be fed in the proper quantity, speed and condition into a treating tank; to provide means for supplying acid solution to the treating tank in the proper amount and condition, and at the desired point; to provide proper receptacles for the treated material and means for conveying said material to said receptacles, and means for extracting the treated material in said receptacles by means of a suitable solvent.

Referring to the drawings which illustrate, merely by way of example, suitable means of effecting my invention, Figure 1 is a sectional view of my apparatus in use, parts being broken away.

Similar characters of reference refer to similar parts throughout the several views.

Figure 1:
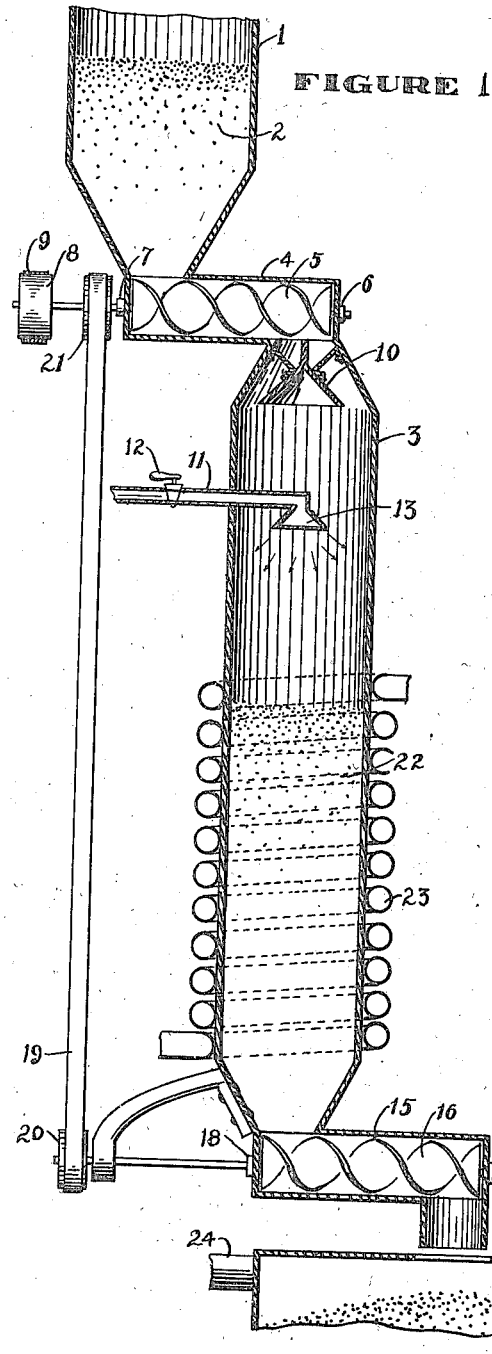

In the accompanying drawings and in the following description I have shown and described in detail an apparatus for treating comminuted wood, but it is understood, of course, that modifications in the form, structure, and operation of the apparatus may be made to conform to the particular nature of the substance to be treated.

Referring now more particularly to the drawings, at 1 is indicated a supply tank, which is filled with comminuted wood 2. At 3 is shown a treating tank connected to supply tank 1 by a conduit 4 in which is mounted a screw conveyer 5 in bearings 6 and 7, the same being provided with a pulley wheel 8 driven by a belt 9 connected to any suitable source of power supply. At 10 is shown a spreader of any suitable type such as shown, and positioned in tank 3 as shown. Tank 3 is preferably cylindrical in form and vertical in position and has an acid solution supply pipe 11 entering its upper portion below spreader 10, said pipe 11 having a controlling valve, as 12, of any suitable type positioned therein and having a spraying nozzle 13 secured to its end and directed downwardly as shown. At 14 is shown a digester tank connected to tank 3 by conduit 15 in which is positioned screw conveyer 16 mounted in bearings 17 and 18 and driven by a belt as 19 and pulley wheel 20. Belt 19 may be driven by a second pulley wheel, as 21, secured to the shaft of screw conveyer 5 or by being connected to any other suitable source of supply not shown. For obvious reasons most of the parts of this apparatus should be made of acid-proof materials.

In operation tank 1 is filled with comminuted cellulose containing material, such as wood indicated at 2. The rotating screw conveyer 5 causes a continuous stream of said material to be fed through conduit 4 and to be discharged upon spreader 10 in tank 3. Spreader 10 is designed to scatter the falling material and cause it to fall evenly the rest of the way in tank 3 in a finely divided state. Valve 12 being open, acid solution under sufficient pressure to discharge from nozzle 13 in the form of a spray becomes intimately mixed with the falling particles of material 2 and thereby forms a moist mass indicated at 22. The rotating of screw conveyer 10 draws the moist mass from tank 3 and discharges the same into digester tanks as 14.

Figure 2:
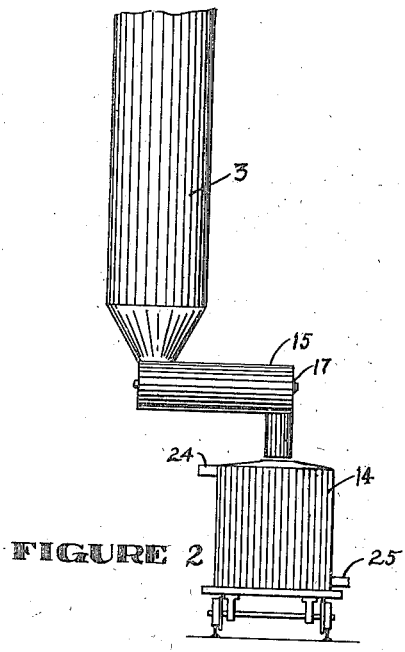
Fig. 2 is an elevation of my apparatus with a movable digester tank in position.
Figure 3:
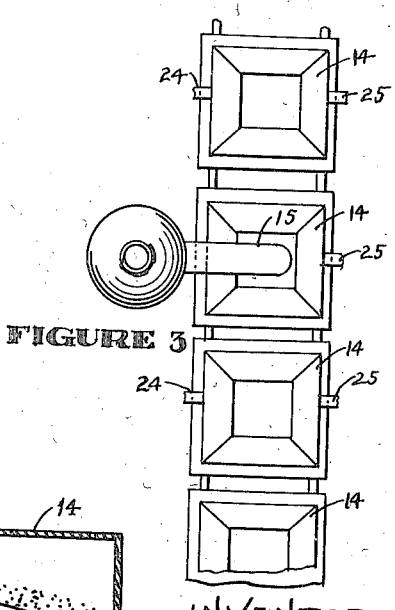
Fig. 3 is a plan view of my apparatus showing a number of movable digester tanks.

It is desirable that a number of these tanks be provided to be filled in rotation as above described, as the material should remain in said tanks for a time, after which air is blown through the same and the material then extracted and the extract dialyzed. A means of circulating water about tank 3 is shown at 23, since it may, at times, become necessary to use a cooling agent for the same. Connections to the digester tanks are shown at 24 and 25. When a number of digester tanks are used they may be arranged in any suitable way so as to be successively placed under the discharge end of conduit 5, for instance as shown in Figs. 2 and 3.

Having thus described my invention, what I claim is:—

A chemical apparatus comprising a receptacle, a treating or mixing tank adapted to receive a predetermined quantity of comminuted material and hold the same in a mass for a predetermined period, a cone shaped spreader rigidly positioned in the receiving end of said mixing tank and adapted to intercept said material entering the same and cause said material to fall into said mass in a cylindrical veil, means for introducing a liquid into the interior of said cylindrical veil and spraying the same into said material, means for cooling the treated material, and means for effecting the simultaneous addition of material to said mass and subtraction of material from said mass.

In testimony whereof I have hereunto affixed my signature this 29th day of January, 1916.

ZENO OSTENBERG.